US009528843B2

(12) United States Patent
Pu et al.

(10) Patent No.: US 9,528,843 B2
(45) Date of Patent: *Dec. 27, 2016

(54) MOBILE NAVIGATION SYSTEM OPERATING WITH A REMOTE SERVER

(71) Applicant: InfoGation Corporation, Cupertino, CA (US)

(72) Inventors: Kent Qing Pu, San Diego, CA (US); Hui Henry Li, San Diego, CA (US)

(73) Assignee: Infogation Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,880

(22) Filed: Aug. 14, 2015

(65) Prior Publication Data

US 2015/0354977 A1    Dec. 10, 2015

Related U.S. Application Data

(63) Continuation of application No. 14/094,740, filed on Dec. 2, 2013, now Pat. No. 9,109,912, which is a continuation of application No. 13/492,901, filed on Jun. 10, 2012, now Pat. No. 8,600,664, which is a continuation of application No. 09/935,463, filed on Aug. 22, 2001, now Pat. No. 8,200,426, which is a continuation of application No. 09/227,331, filed on Jan. 6, 1999, now Pat. No. 6,292,743.

(51) Int. Cl.
| | |
|---|---|
| *G01C 21/36* | (2006.01) |
| *G01C 21/34* | (2006.01) |
| *H04W 4/02* | (2009.01) |
| *G01C 21/26* | (2006.01) |
| *G08G 1/0968* | (2006.01) |

(52) U.S. Cl.
CPC ............. *G01C 21/362* (2013.01); *G01C 21/26* (2013.01); *G01C 21/3415* (2013.01); *G01C 21/3453* (2013.01); *G01C 21/3484* (2013.01); *G01C 21/3617* (2013.01); *G01C 21/3626* (2013.01); *G08G 1/096811* (2013.01); *G08G 1/096838* (2013.01); *G08G 1/096861* (2013.01); *G08G 1/096883* (2013.01); *H04W 4/02* (2013.01)

(58) Field of Classification Search
CPC .............. G01C 21/362; G01C 21/3415; G01C 21/3625; G01C 21/3617; G01C 21/3484; G01C 21/26; G01C 21/3453; H04W 4/02; G08G 1/096811; G08G 1/096838; G08G 1/096861; G08G 1/096883
USPC ................... 701/411, 420, 533; 340/990, 8.1
See application file for complete search history.

(56) References Cited

U.S. PATENT DOCUMENTS 6,108,631 A * 8/2000 Ruhl .................. G01C 21/3608
                                                      340/989

* cited by examiner

*Primary Examiner* — Marthe Marc-Coleman
(74) *Attorney, Agent, or Firm* — Joe Zheng

(57) ABSTRACT

A client navigation system establishes a wireless connection to a navigation server on a computer network. The client requests a route by uploading start and destination specifications. The server calculates an optimal route based on real-time data available on the network. A generic natural language description is used to specify the optimal route downloaded to the client. The natural language description is a plain text description for each link using pre-defined generic terms. The client interprets the route, interfaces with the local mapping data and reconstructs the optimal route. The route is subsequently displayed and highlighted on the client.

18 Claims, 10 Drawing Sheets

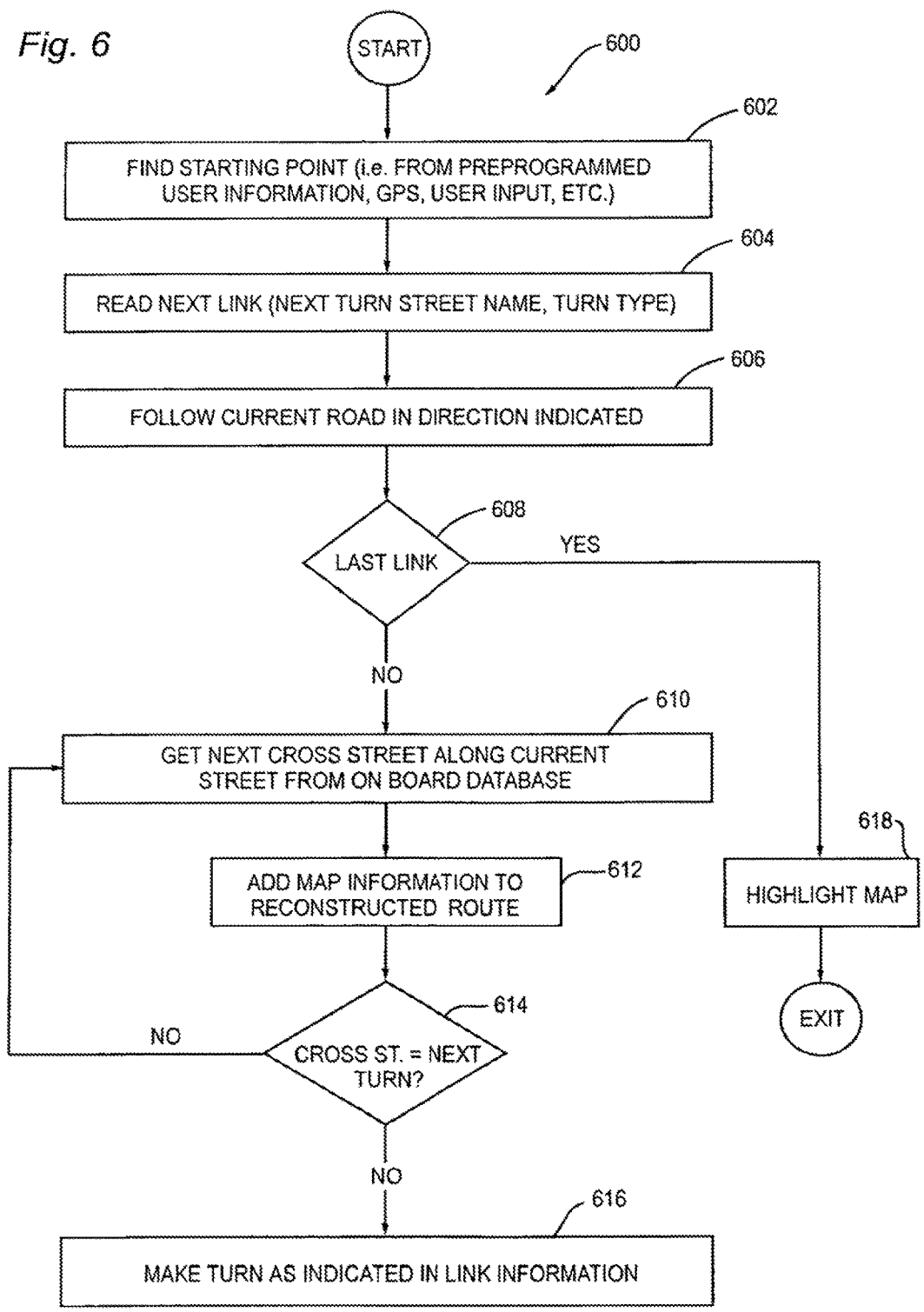

MOBILE NAVIGATION SYSTEM OPERATING WITH A REMOTE SERVER

CROSS-REFERENCE TO RELATED APPLICATION

This is a continuation of U.S. application Ser. No. 14/094,740, entitled "Mobile navigation system operating with a remote server", filed on Dec. 2, 2013 and now U.S. Pat. No. 9,109,912, which is a continuation of U.S. application Ser. No. 13/492,901, entitled "Method and apparatus for GPS services based on client and server architecture", filed Jun. 10, 2012 and now U.S. Pat. No. 8,600,664, which is a continuation of U.S. application Ser. No. 09/935,463, entitled "Method and apparatus for determining a time zone in GPS devices", filed Aug. 22, 2001 and now U.S. Pat. No. 8,200,426, which is a continuation of U.S. application Ser. No. 09/227,331, entitled "Mobile navigation system", filed Jan. 6, 1999 and now U.S. Pat. No. 6,292,743.

BACKGROUND OF THE INVENTION

1. Field of the Invention

The present invention relates generally to mobile navigation system and apparatus, and more particularly to a distributed navigation system having a wireless connection to a server for calculating optimal routes using real-time data.

2. Related Art

In recent years, navigation systems, in which automobiles are equipped with a navigational computer that includes a display screen, an input means such as a keypad or a remote control, and a storage means such as a CD, have become popular. Geographical map and routing data is typically stored on the CD. The map database on the CD can have various levels of detail. At the very least, the map database includes geographical information at the major road level. Additional details that can be included are minor roads, turn restrictions, one-way streets, highway ramp configurations, hotel, restaurant and other business information, traffic history, emergency facility locations and the like. The map databases with routing information are referred to as navigable map data or turn-by-turn data. The levels of detail stored on such databases depend on product and marketing factors, including cost and demand, as well as the physical storage capacity limitations.

Such navigation systems are stand-alone devices that rely completely on data stored on the local storage device for geographical and other information. Thus, the capacity of the storage device becomes a limiting factor as to how much information is available to users. In addition, users must update their mapping databases frequently to stay current. Typically, the cost of mapping databases increase with the amount of details provided thereon.

It would be desirable to have a navigation system that provides current information to users without the need to update their local databases whenever changes occur. In addition, it would be desirable to include real-time information such as traffic, weather and road conditions and the like for determining optimal routes. Further, it would be desirable to increase the level of details provided by current navigation systems without requiring expensive databases and/or databases that are beyond the capacity of the local storage device.

A current system, which connects to on-line servers in real-time, is Toyota's MONET navigation system implemented in Japan. The MONET system establishes a connection to the server that is responsive to requests for real-time information including current traffic conditions and the like. The server gathers the requested information and uploads the data to the client.

In this fashion, the MONET system, and other similar current systems, provide information and/or services to users in real-time. This information and/or services include real-time traffic data, road restrictions, email services, news, sports, and weather reports, points-of-interest data, and emergency information such as police, hospital and roadside assistance. These current systems also typically allow the user to download pictures of current traffic conditions, points of interest and the like.

In these current systems, all geographical data transmitted by the server is in a propriety format. That is, downloaded information used to describe geographical data, such as point-of-interest addresses and detailed map data, includes data points, indices and the like that are specific to the particular mapping database used on the client.

Accordingly, the client navigation system must have a particular pre-defined mapping database installed in order to work with the server. In some cases, the mapping database used by the client and server must be identical. If there is a mismatch between the expected mapping database and the actual mapping database used on the client, the client cannot properly interpret the geographical data downloaded from the server and the system will fail to operate.

Accordingly, customers using these current systems must obtain the latest version of the mapping database software available. This presents a major burden for customers and manufacturers alike due to the high frequency in which these databases must be updated.

In addition, the data downloaded by the client generally requires high bandwidth communication channels due the shear volume of data transmitted by these current systems. Such high bandwidth communication channels are expensive and may not be readily available in all areas. It would be desirable to develop a system that requires lower bandwidth communication channels than that required by these current systems.

Another problem with the current systems outlined above is that the client must include sophisticated algorithms for calculating optimal routes. In addition, these route-calculating algorithms in the client must be updated in accordance with current services and options available on the server. For example, if the server were updated to provide a new or modified feature to the client, the client must be specifically customized to support the new or modified feature. Thus, a very close coordination between the software installed on the server and the software installed on the clients must be maintained. This creates an additional economic burden for customers.

Another problem with the current systems is that the proprietary server cannot be used with navigation systems and mapping databases provided by other manufacturers. As stated, using current systems, client software must be frequently customized and very specific mapping software must be used. It would be desirable to have a navigation system that can be easily adapted to work with a variety of mapping software and navigational systems.

SUMMARY OF THE INVENTION

The present invention alleviates many of the failings of the prior art. One advantage of the present invention is that it alleviates the need to have specific pre-defined turn-by-turn mapping databases installed on the client. The present invention can be used with any mapping database installed on the client navigation system. In addition, the level of detail necessary for the client-installed mapping database is minimal.

Another advantage of the present invention is that the client navigation system can be made much less complex than those used in current systems. A feature of the present invention is that the server performs routing generation on behalf of the client. The routing generation takes all real-time variables into account, as well as user preferences and the like. Accordingly, the present invention alleviates the need to install sophisticated and expensive routing algorithms and/or complex hardware components on the client that are used to perform local routing calculations. In many cases, the role of the client system can be limited to displaying routes generated by the server.

Another advantage of the present invention is that it does not require software changes on the client navigation systems whenever the server provides new and/or modified features. All enhancements to the services provided by the server are independent from the software installed on the client.

Another advantage of the present invention is that it alleviates the need for users to update their mapping database whenever a new version is available. A feature of the present invention is that the server is hardware and software independent from the client. In this fashion, navigation systems from any vendor can be easily adapted to work with the server of the present invention.

Another feature of the present invention is that is uses a natural language to describe optimal routing information that can be interpreted by a variety of clients with minimal software additions. An advantage of the present invention is that low bandwidth communication channels can be used to download the information from the server to the clients. A further advantage of the present invention is that the natural language routing descriptions can be highly compressed to thereby reduce the already low bandwidth requirements of the wireless communication channels.

A generic natural language description is used to specify optimal routing information that is transmitted from the server to the client. The natural language description is completely independent from the local mapping database software used on the clients, and can therefore be used in conjunction with any type of mapping database software.

The client navigation system establishes a wireless connection to the server via cellular telephone technology or the like. Once connected, the client requests a specific route by uploading start and stop specifications to the server. The server independently calculates an optimal route for the user based on real-time and current data available to the server, as well as user preferences or the like.

The routing information is formatted using a natural language specification in accordance with each specific embodiment of the present invention. Generally this specification includes a plain text description for each link in the route using pre-defined generic terms such as road names and turning directions. The client interprets this routing data and interfaces with the local mapping database to reconstruct, in the format required by the client, the optimal route from the natural language description. This is accomplished by using a mapping reconstruction algorithm stored on the client.

Once the route is reconstructed, it is displayed on the display screen on the client navigation system, using whatever mapping database is present on the client. In this fashion, the database software used on the server is completely hardware and software independent from that used on the client.

In one embodiment of the present invention, an enhanced user-interface data-entry feature is provided. This "auto complete" feature anticipates data being entered by users to minimize the data-entry process. This feature is especially useful in an automobile navigation system due to the inherent difficulty in entering data while driving.

In another embodiment of the present invention, the current time zone is derived from the current GPS position. This information is used to set the clock on the navigation system to a highly accurate local time. In addition, this feature avoids the problem found in current systems that do not update local clocks.

In another embodiment of the present invention, maps are automatically scrolled on the display screen so that a representation of the automobile always points to the right or to the left. This enhanced user-interface feature provides a more efficient display allowing for more look-ahead space on displays that are wider than they are tall.

In another embodiment of the present invention, a telephone coupled with the navigation system automatically displays the current local time for a called party, even if the called party is in a foreign country. The dialed number is used to query a local database for providing local time information for the called party.

Further features and advantages of the invention, as well as the structure and operation of various embodiments of the invention, are described in detail below with reference to the accompanying drawings.

BRIEF DESCRIPTION OF THE FIGURES

The present invention is described with reference to the accompanying drawings, wherein:

FIG. 6 is a flowchart depicting a process that can be used to implement the map reconstruction feature in accordance with an embodiment of the present invention;

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Figure 1:
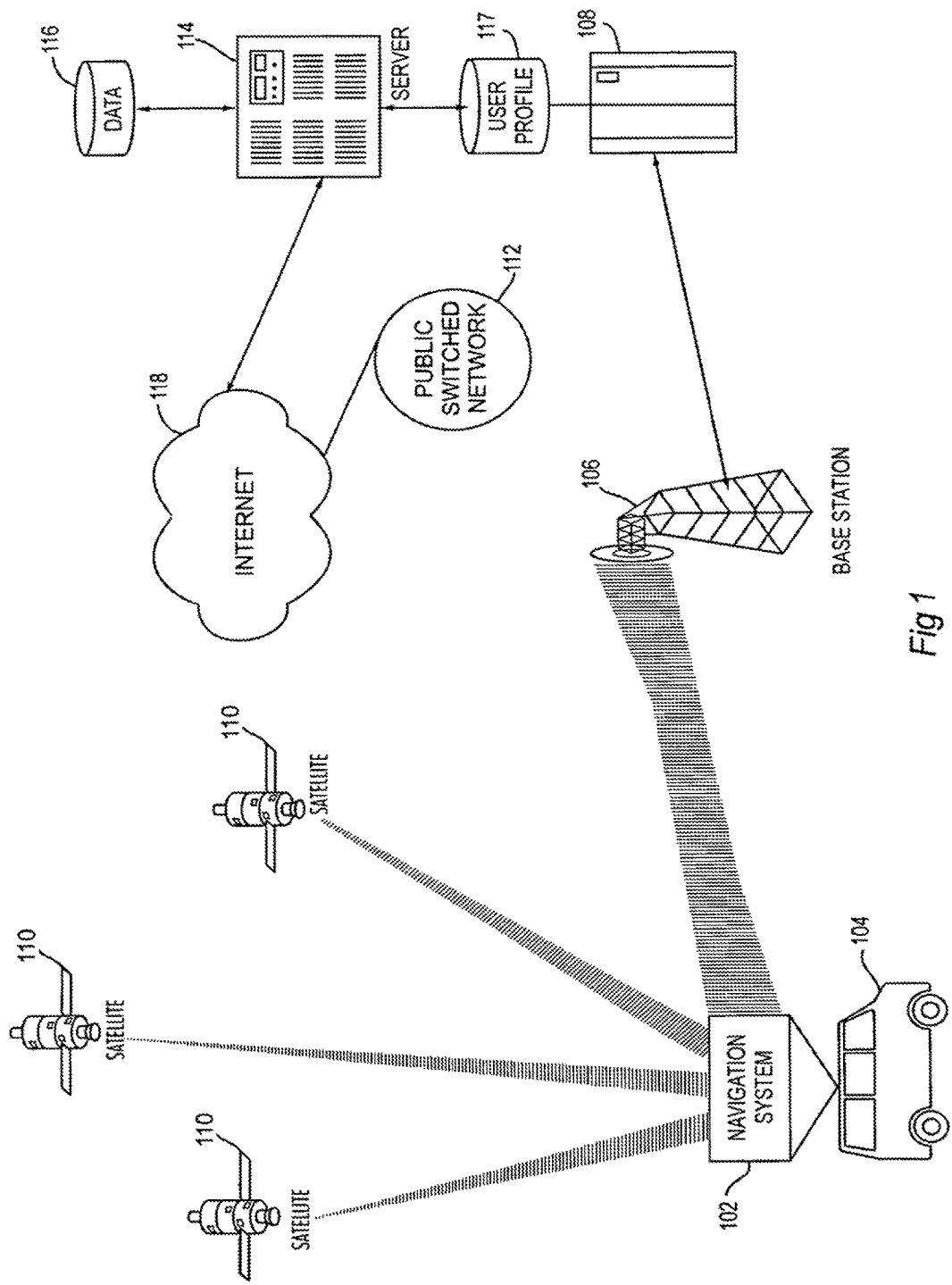
FIG. 1 depicts an operational environment according to an embodiment of the present invention.

FIG. 1 depicts an operational environment according to an embodiment of the present invention. A navigational system 102 is installed in a mobile unit such as an automobile 104. In one embodiment, the navigation system 102 receives data from Global Positioning System (GPS) satellites 110 for tracking purposes. A minimum number of three satellites is needed to obtain accurate readings. As described below, the connection to the GPS satellites 110 is an optional component of the navigation system 102 according to the present invention.

The navigation system 102 has the capability for wireless communications. In this example, one use of the wireless communication feature is to connect the navigation system 102 with a computer network, such as the Internet 118. The wireless communication feature of the present invention is also used for providing standard telephony functions.

In one example, cellular technology is used to implement the wireless communication feature of the present invention. In FIG. 1, the base station 106 and the mobile switching office 108 represent a portion of a typical cellular network. The base station 106 sends and receives radio signals to and from the navigation system 102. The mobile switching office 108 is coupled to the base station 106 via standard telecommunication transmission lines. Likewise, the mobile switching office 108 is coupled to the public switched telephone network 112 via standard telecommunication transmission lines. The public switched network 112 is coupled to the Internet 118 via a point-of-presence, which is typically implemented using high bandwidth T3 telecommunication channels or the like.

A navigation server 114 is coupled to the Internet 118. The navigation server 114 is used to generate and download optimal routing information to the navigation system 102 in accordance with real-time data gathered from various providers on the Internet 118, and current mapping data stored in the database 116, and user profile information stored in the database 117.

Note that the cellular network is just one example of a technology that can be used to implement the wireless communication feature of the present invention. In other embodiments, different types of wireless technology can be used, such as low orbit or geosynchronous orbit satellite communications. In fact, any type of wireless technology can be used to provide the wireless communication feature of the present invention.

Further, the Internet 118 is used in a preferred embodiment of the present invention due to its wide use and availability. However, any type of computer network can be used in alternate embodiments of the present invention. As such, the use of the examples of a cellular network and the Internet 118 should not be construed to limit the scope and breadth of the present invention.

Figure 2:
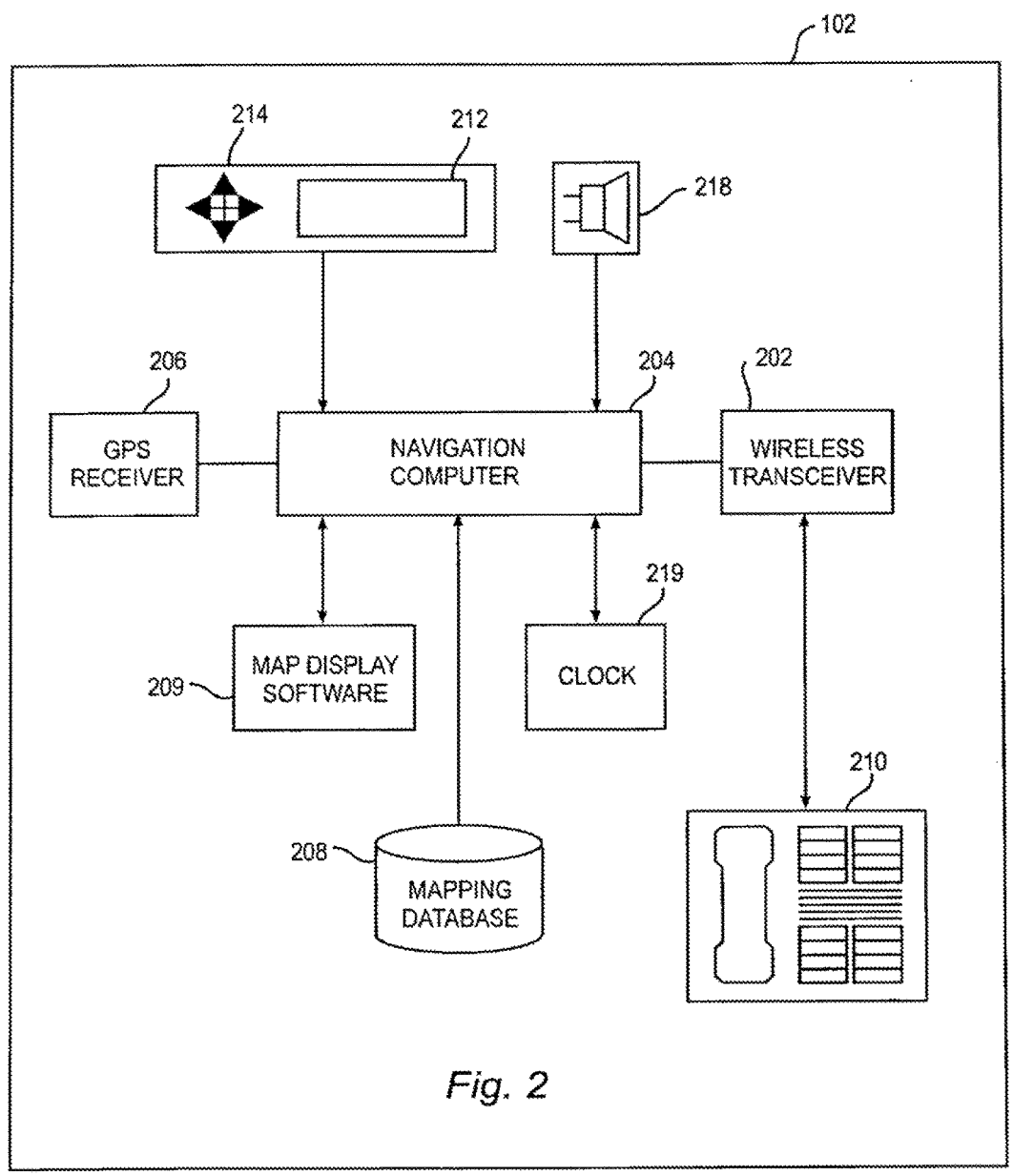
FIG. 2 is a block diagram depicting details of the navigation system according to an embodiment of the present invention.

Details of the navigational system 102 are depicted in FIG. 2. Specifically, the navigation system comprises a navigation computer 204, a mapping database 208, a display screen 212, a keypad input device 214, a speech interface 218, a GPS receiver 206, a wireless transceiver 202 and a telephony device 210.

Note that these components, such as the GPS receiver 206 and/or the wireless transceiver 202 may be imbedded within the navigation computer 102. Alternatively, such components may be implemented as discrete external devices coupled to the navigation computer 102 through external ports, such as RS-232, SCSI, USB ports or the like.

Any type of general or special purpose computer system can be used to implement the navigation computer 204. Typically the navigation computer 204 includes a CPU, local working memory, or RAM, non-volatile program memory, or ROM, and some form of non-volatile external memory such as a CD storage system or the like. An example of a general-purpose computer system that can be used in an embodiment of the present invention is a Clarion Auto PC manufactured by Clarion Corporation of America.

The display screen 212 is used to display output from the navigation computer 204. For example, geographical maps from the mapping database 208 are displayed on the display screen 212. In this example, the display screen 212 is a liquid crystal display that conforms to the Auto PC platform specification maintained by Microsoft Corporation. In this example, using the Auto PC platform specification, the navigation system 102 fits into a standard 1-DIN unit in the dash of an automobile 104. In accordance with this example standard, the display screen 212 is 256 pixels wide by 64 pixels tall. An improved method for displaying a navigational mapping system on such a display is described in detail below with reference to FIGS. 10A and 10B.

The keypad device 214 is coupled to the navigation computer 204 and is used for inputting data. For example, start and stop designations for a desired navigational route are input into the navigation computer 204 via the keypad 214. An improved method for efficiently inputting data into the navigation system via the keypad 214 is described in detail below with reference to FIGS. 7A, 7B and 7C.

A clock 219 coupled to the navigation computer 204 displays the local time. In one embodiment, the clock 219 has a mode in which it displays the local time of a called party via the telephonic device 210. Note that in one embodiment, the time is displayed on the display screen 212. Alternatively, in another embodiment, the time is displayed on a display on the telephonic device 210. Alternatively, in yet another embodiment, the time is displayed on another display device coupled to the navigation computer 204.

In this example, a speech interface 218 is also coupled to the navigation computer 204. The speech interface 218 uses voice recognition techniques to accept spoken commands from users for controlling the navigation computer 204. The speech interface 218 is used in a preferred embodiment to allow users to control the computer 204 via spoken voice commands for promoting safe driving conditions while operating the navigation system 102.

The mapping database 208 is used to store local mapping data. As described in detail below, the local mapping database can be any type of mapping database supported by a specific implementation of the present invention. The mapping database need not match the mapping database 116 used by the navigation server 114.

The map display software 209 comprises methods for displaying, on display 212, routes reconstructed from the optimal routing information provided by the server 114.

The wireless transceiver 202 is used to send and receive data between the navigation computer 204 and the navigation server 114. In addition, the wireless transceiver 202 is used to provide standard and enhanced telephony services via the telephonic device 210. In one embodiment of the present invention, an enhanced telephony service that is provided is one that automatically displays the current time of day relative to a called party's location upon dialing out. This aspect of the present invention is described in detail below with reference to FIG. 11.

The GPS receiver 206 is used to track the position, speed and bearing of the mobile unit 104. As is well known, the GPS is a collection of 24 satellites owned by the US Government. Other similar systems can also be used in alternate embodiments of the present invention. One example of a similar system is the Russian GLONASS system.

In general, the GPS and other similar systems provide highly accurate positioning and navigational information. Currently, the US GPS comprises 24 twenty-four NAVSTAR GPS satellites which orbit 12,000 miles above the earth and constantly transmit their individual positions as well as the current precise time-of-day. The current precise time-of-day is provided by one of four highly accurate on-board atomic clocks.

GPS receivers, such as the receiver 206, listen to the information received from at least three satellites to determine the precise location of the receiver, as well as velocity and bearing information (if in motion). The GPS receiver 206 determines its distance from the satellite by using the travel time of the radio message from the satellite 110 to the receiver 206. After calculating its relative position from at least three satellites 110, the current position is calculated using well known triangulation techniques.

Accordingly, when the GPS receiver 206 is present, the navigation computer 102 uses data from the GPS to track the current location of the mobile unit 104. The current location is overlaid on a map from the mapping database 208 and is displayed on the display screen 212.

In one embodiment of the present invention, the precise location that is calculated by the GPS receiver 206 is used to determine current time zone information. This information can be used for example to set a highly accurate compensated local time in the navigation computer 204. Details of this aspect of the present invention are subsequently described below with reference to FIGS. 8 and 9.

Figure 3:
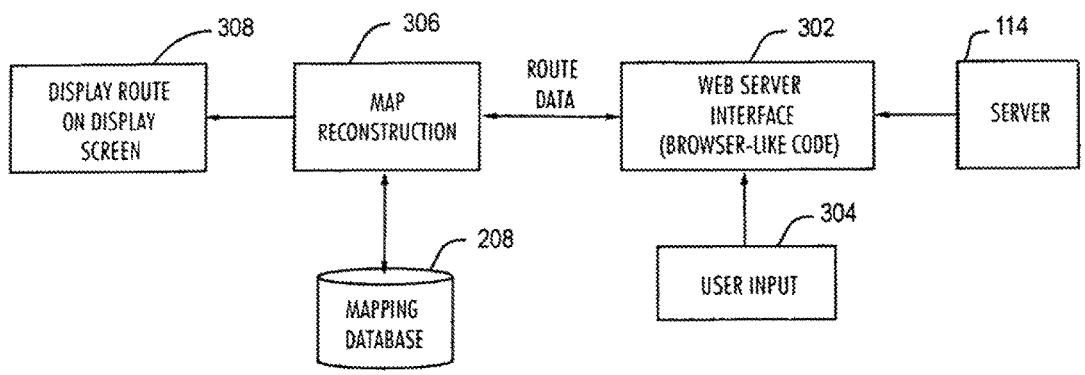
FIG. 3 is a block diagram depicting some of the functional components of the navigation system in accordance with an embodiment of the present invention.

FIG. 3 is a block diagram depicting some of the functional components of the navigation system in accordance with an embodiment of the present invention. The navigation computer 204 is provided with a web server interface component 302. The web server interface component 302 is used to perform web browser-like functions for the navigation computer 204. As shown, the web server interface is coupled with the navigation server 114. This is generally accomplished through the use of the wireless transceiver 202.

Accordingly, the web server interface module 302 interprets data streams from the server for displaying display text and/or graphics on the display screen 214. Preferably, the data streams transmitted by the server 114 are in a standard format, such as HTML, a modified version of HTML or the like. In this fashion, generic web-browsing tools can be used to interface with the web navigation server 114 of the present invention.

The web server interface module 302 is also used to accept input 304 from the user and transmit such user input 304 to the server 114. For example, users may request a route to be calculated by the server 114 by inputting route start and stop designations.

Route data that is calculated by the server 114 is downloaded to the navigation computer 204 via the web server interface 302. The map reconstruction module 306 then processes the route data. In particular, the map reconstruction module interprets the route data and reconstructs, in the format required by the map display software 209, the optimal route calculated by the server 114, using the local mapping database 208. As indicated by block 308, the reconstructed mapping data is displayed, by the map display software 209, on the display screen 214.

Figure 4:
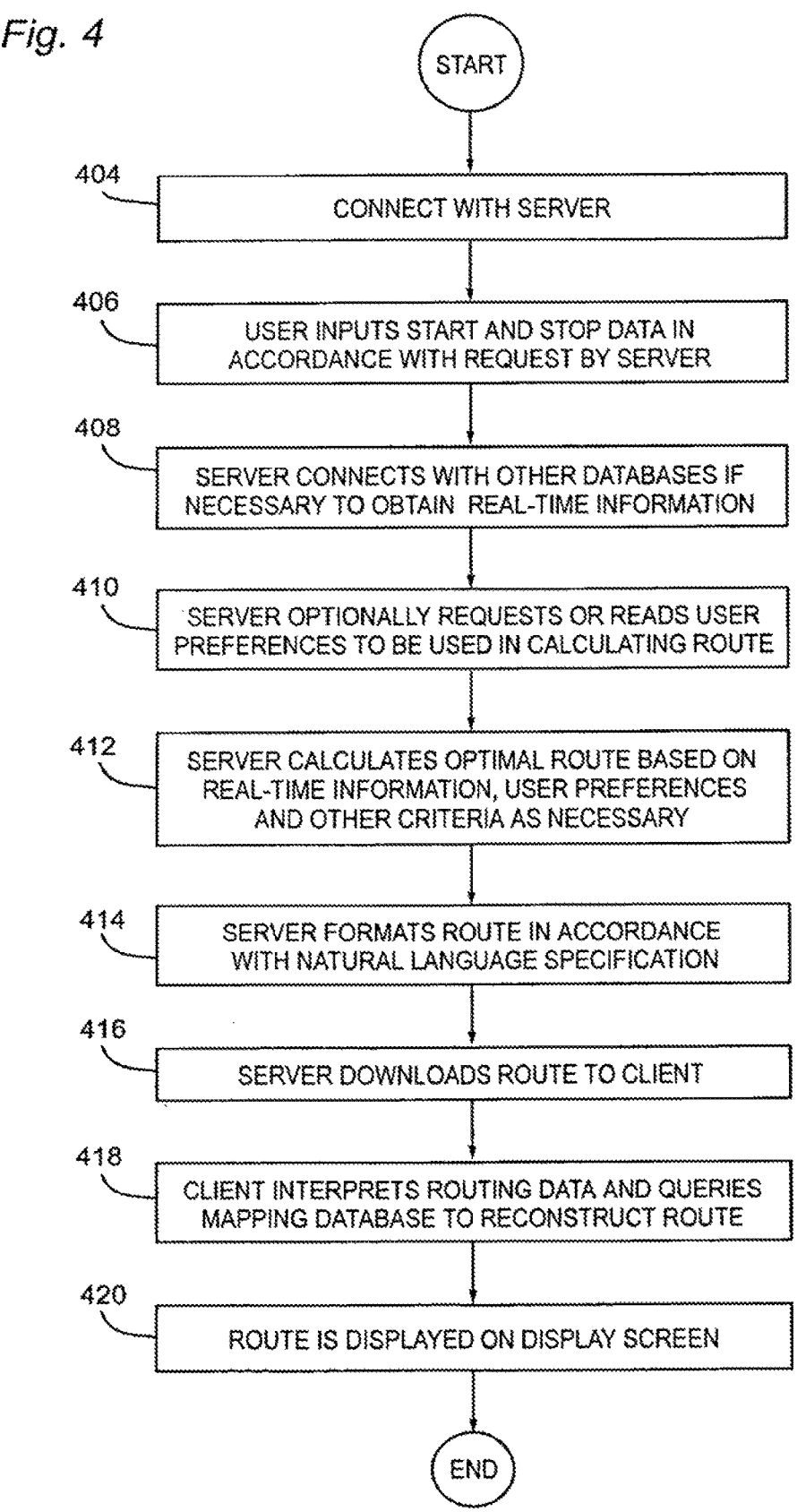
FIG. 4 is a flowchart that depicts a process that can be used in an embodiment of the present invention.

FIG. 4 is a flowchart that depicts a process that can be used in an embodiment of the present invention. The process begins with step 404, where the navigation computer 204 establishes a connection with the server 114. Once a connection is established, the user inputs start and destination parameters for a requested route.

In step 408, the server connects with other databases, as necessary to obtain real-time information that is to be used in calculating an optimal route for the user. For example, the server may connect with another server on the Internet 118 that provides current traffic or road conditions relevant to the proposed route. Alternatively, such information may reside in one or more resources directly controlled by the navigation server 114, such as the database 116, or the user profile 117.

In any case, the Internet 118 is a preferred computer network used in an embodiment of the present invention because of the wide availability of information offered by governmental, educational and commercial sources. Thus, depending on the specific implementation of the present invention, real-time data provided by the present invention can originate from the navigation server 114, or from other sources on the Internet 118.

Accordingly, the knowledge base used by the navigation server 114 can be local or widely distributed, depending on each specific implementation of the present invention. On one end of the spectrum, the navigation server 114 provides all of the real-time information for the mobile navigation system 102. On the other end of the spectrum, none of the real-time data is provided directly from navigation server 114, but from other resources available on the Internet 118. In a typical embodiment, the distribution of the knowledge base falls somewhere in-between these two extremes.

In step 408, the server 114 optionally reads or requests user preference data for calculating the route. For example, the user may want to avoid toll roads, dirt roads or major highways. The server 114 can request this information from the user in real-time. Alternatively, such information may be pre-stored from previous sessions and is accessible by the server 114, from the database 117. Many known methods can be used to obtain user specific information, such as the use of cookies and the like. Such methods would be apparent to persons skilled in the relevant art(s).

In step 412, the server calculates an optimal route based on the start and destination data from step 406. the real-time data from step 408, and the user information, if any, from step 410. Next, in step 414, the server 114 formats the routing data in accordance with a natural language specification. An example of a natural language specification that can be used to implement an embodiment of the present invention is described below with reference to FIG. 5.

Next, in step 416, the server downloads the calculated optimal route to the navigation computer 204. Typically, this data is compressed prior to downloading in step 416. Upon receipt of the compressed data, the client uses a decompression algorithm to expand the data to its original text format. The textual nature of the natural language specification of the present invention provides for highly compressible routing data to thereby reduce bandwidth requirements for the wireless connection.

In step 418, the client interprets the routing data, queries the mapping database 208, and reconstructs the optimal route in terms that are native to the mapping database 208 and/or the map display software 209. In step 420 the route is displayed, by the map display software 209, on the display screen 212, as indicated by block 308.

Figure 5:
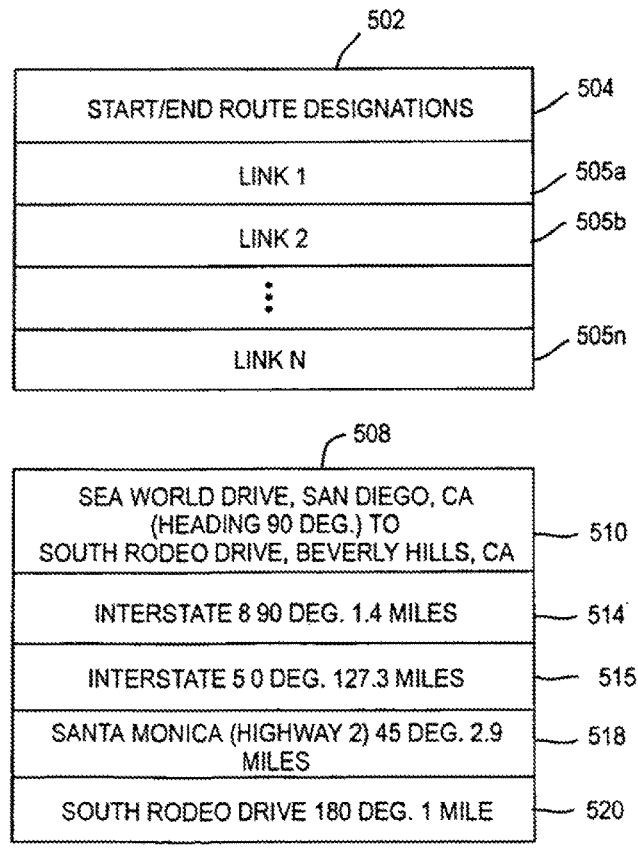
FIG. 5 is a block diagram describing a natural language format that can be used to specify route in accordance with an embodiment of the present invention.

FIG. 5 is a block diagram describing a natural language format that can be used to specify routes in accordance with an embodiment of the present invention. A generic designation for the natural language description is depicted in block 502. This is followed by a specific example of a formatted calculated route as shown in block 508.

The natural language description 502 preferably consists of start and end route designations 504. These designations are described using a natural language specification and generally include such information as street names and city names, etc. In addition, in a typical embodiment, the start/end route designation includes a start direction.

The start and end route designations are followed by a number of links 505a, 505b . . . 505n (generally 505). Each link 505 is described using a natural language description. This can include m any variables such as a street name, a distance, a turning orientation, a landmark designation, a turning distance from the landmark, etc. Many variations can be used in different embodiments of the present invention in accordance with desired features.

In a preferred embodiment, a minimal amount of information is used to describe each link to minimize bandwidth requirements. The route table 508 depicts a specific example of a calculated route that begins on Sea World Drive in San Diego Calif. and ends on South Rodeo Drive in Beverly Hills Calif.

As stated above, the natural language routing description 502 begins with the start/end route designations 504. An example of a start/end route designation is shown in block 510. These designations can be as simple as the name of the start and end streets as well as the city and state of such streets. In this example, the start/end route designation is defined as "Sea World Drive, San Diego Calif. to South Rodeo Drive, Beverly Hills Calif. The meaning of these terms is self-explanatory.

The first link 514 describes information about the next turn. In particular, the link 514 lists the name of the next road ("Interstate 8"), the orientation of the turn at Interstate 8 ("90 Deg.") and the distance to the turn at Interstate 8 ("1.4 miles"). Similarly, Link 515 lists the name of the next road ("Interstate 5"), the orientation of the turn ("0 Deg.") and the distance ("127.3 miles"). The next link 518 lists the name of the next road ("Santa Monica Highway 2"), the orientation of the turn ("45 Deg.") and the distance to the turn ("2.9 miles"). Finally, the last link 520 lists the next turn ("South Rodeo Drive"), the turning orientation ("180 Deg.") and the distance to the turn ("1 mile").

As described below, this information is processed by the navigation computer 204 to reconstruct and display the route 508 using the local mapping database 208. As stated, the local mapping database 208 can be different from the mapping database 116 used by the server 114 to calculate the route. Specifically, the map reconstruction module 306 reads the natural language routing description 508 and reconstructs the route in step 418.

A method that can be used by the map reconstruction module 306 to reconstruct the route (as shown in step 418 from FIG. 4) will now be described with reference to FIG. 6. The map reconstruction process 600 begins with step 602. In step 602, the process finds the starting point of the route. Typically, this starting point is listed in the first entry 504 in the natural language description 502. It should be noted that there are many ways in which to specify a start location. For example, in one embodiment, the start location is specified in accordance with the current GPS location. In another embodiment, the start location is specified by specific user input. In yet another embodiment, preprogrammed user information, such as a home or work address is stored in either the navigation computer 204 or the user profile database 117. In any case, various methods for specifying a start location that can be used in specific embodiments of the present invention would be apparent to persons skilled in the relevant art(s).

Accordingly, in step 602, the start location is found within the local mapping database 208. Specific methods for searching the local mapping database 208 depend on the actual mapping database being used in each specific implementation of the present invention. Typically, standard map data accessing function calls are used in accordance with requirements of a predefined application-programming interface (API). Specific method steps for searching various types of mapping databases 208 would be apparent to persons skilled in the relevant art(s).

Once the starting point is found on the mapping database 208, the process continues with step 604. In step 604, the next link is extracted from the natural language description 505. As stated, this includes at least the street name of the next turn ("next turn street") and the type of the next turn ("turn type"). It should be noted the turn type could be specified in various ways. For example, the turn type could be specified in terms of absolute degrees, as shown in FIG. 5 or as directional indicators, such as N, NE, E, SE, S, SW, W and NW. Alternatively, the turn type could be specified as a left turn or a right turn, a left bear or a right bear, etc. Any method for describing turns can be used in alternative embodiments of the present invention.

Next, in step 606, the current road in the mapping database 208 is followed in the indicated direction. The indicated direction is determined by the start/end route designations 504, or from the last turn. Next, in step 608 the process determines if the last link 505n has been processed. If so, the map is highlighted in accordance with the reconstructed routing information determined from the previous steps. Typically, the highlighted map is displayed on the display screen 212.

If the last link 505n has not been reached in step 608, control passes to step 610. In step 610 the current road in the mapping database 208 is searched for the next occurrence of a cross street. The goal is to determine the exact location (i.e. the latitude and longitude) of each maneuver. This is accomplished by finding the intersection of the two streets before and after a maneuver under consideration. In one embodiment, it is assumed that the street names and the city name of the streets have been extracted from the turn-by-turn text instructions provided by the server.

This task can be achieved by using standard map data accessing function calls. A node ID of the maneuver point (intersection) can thus be obtained. Once the maneuver point is identified, the road segment corresponding to the next cross street can be determined.

Next, in step 612, the process adds the map information to the reconstructed route. Control next passes to step 614.

The objective is to construct a route data structure or "link list" which consists of all the shape points along the route. Given two nodes (i.e. maneuver points) and the name of the road between them, the process traces through the segments that connect the two nodes. From each segment, a series of shape points can be obtained. The result of step 612 is link list of shape points, which define part of the route.

Next, in step 614, the process double checks if the found cross street matches the turn street. In a preferred embodiment, fuzzy logic is used to implement the street name comparison in step 614 to account for differences in spelling and for differences in street names such as "road" verses "drive", "street", or "circle" and abbreviations and the like. If an exact match is not found, heuristic techniques can be used to determine the best match. Typically, this involves additional searching in the current direction to determine if other candidates exist.

If in step 614, a match between the cross street and the turn street is found, control passes to step 616. In step 616, the process makes the turn as indicated in the link information. Control next passes back to step 604, where the next link is read. The process represented by steps 604-616 continues until step 608 determines that the last link has been processed, as described above.

The outcome of this algorithm depicted by flowchart 600 is a link list of shape points, which define the optimal route downloaded from the server 114. A subset of the link list of shape points is the actual maneuver points. This reconstructed route data can then be used to display and route track a vehicle progression along the route. The navigational computer 204 can then issue guidance instructions to the user at appropriate times (e.g. when the automobile 104 approaches a turn).

An enhanced user-interface data-entry feature will now be described with reference to FIGS. 7A, 7B and 7C. This feature is preferably used in embodiments of the present invention that include the use of data entry fields similar to the type shown in FIG. 7C. This type of data entry field is hereinafter referred to as a "keypad data entry field." A keypad data entry field provides the capability for inputting alphanumeric characters with the use of a keypad device, rather then a keyboard device. Keypad data entry fields can be found, for example, in Microsoft's CE Auto PC operating system.

Figure 7A:
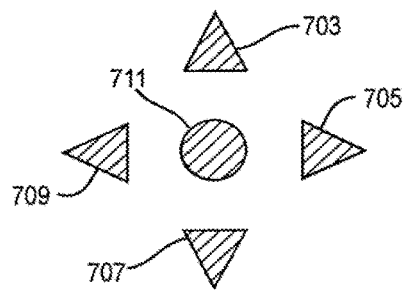
FIGS. 7A, 7B and 7C are block diagrams depicting an enhanced user-interface feature for data-entry in accordance with an embodiment of the present invention.
Figure 7B:
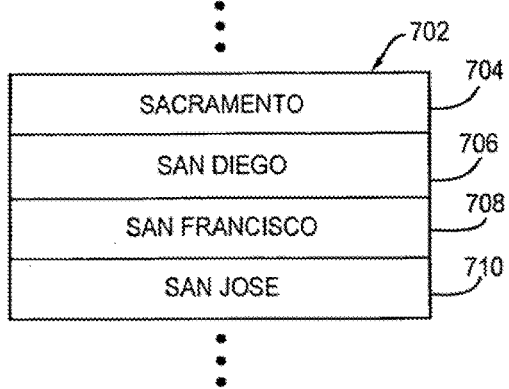

The keypad input device 214 used in one embodiment of the present invention consists of five keys that are arranged as shown in FIG. 7A. In this example, the central key 711 is used to perform an "Enter" function and is hereinafter referred to as the "enter-key 711." The four directional keys 705, 707, 709, and 703 are generally used to alter the position of a screen object, such as a cursor or the like. In addition, the directional keys are used to scroll data as described below.

Figure 7C:
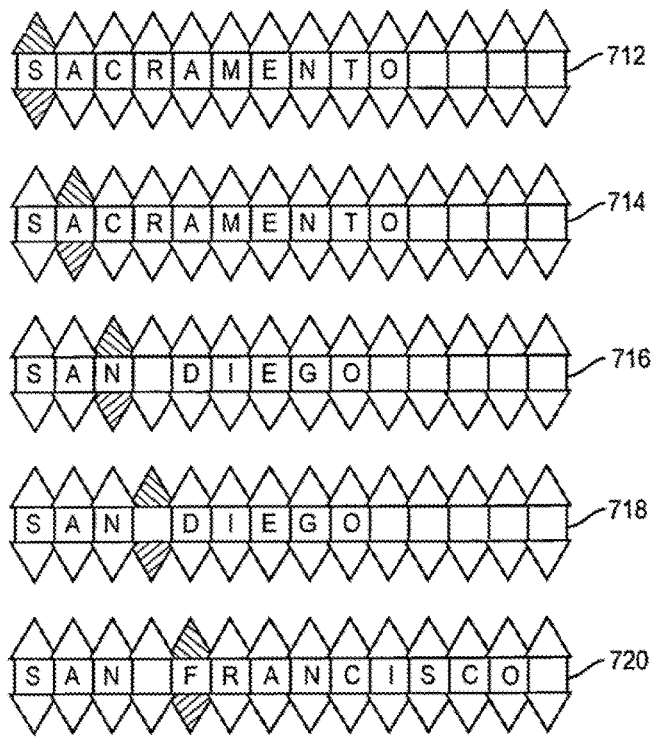

FIG. 7C represents a single keypad data entry field shown at different points in time. In particular, in this example, the elapsed time increases as the reference numerals 712-720 increase. In this example, different character positions are highlighted (as indicated by darkened triangles) at each point in time 712-720. That is, the first character is highlighted at time 712, the second at time 714, the third at time 716, the forth at time 718 and the fifth at time 720.

The highlighted character position indicates the active character position. When a particular character position is active, users can manipulate the data within that position by using the up and down arrow keys 703 and 707, respectively. Typically, pressing the up arrow key 703 scrolls data in the data in the active character position in a descending alphabetical order. Similarly, pressing the down arrow key 707 scrolls the data in the active character position in an ascending alphabetical order.

Further, users select which character position in the data entry field is active by manipulating the left 709 and right 705 arrow keys. The enter-key 711 is generally depressed to indicate that data should be entered and accepted by the program.

The enhanced user interface feature of the present invention anticipates the contents of data being entered by the user and fills-in the data entry field with the anticipated characters to the right of the active character position. In this fashion, if the anticipated data is correct, the user need not enter data into the remaining character positions, but instead, immediately presses the enter-key 711.

In addition, the method constantly determines a valid character set for each character position. Therefore, when user presses up arrow key or down arrow key for scrolling characters, only valid characters appear in the keypad data entry field in accordance with the set of allowable entries. This feature of the present invention is especially useful in a mobile environment such as an automobile, where data entry is not only cumbersome, but can also be dangerous.

The enhanced user-interface feature of the present invention functions as follows. FIG. 7B represents a portion of a database comprising allowable cities that can be specified by a user, for example, when specifying the start and/or stop route designations in step 406. In this example, the cities are listed in alphabetical order, but any order can be used in alternate embodiments.

As shown by the data entry field at time 712, the user enters an "S" in the first character position by manipulating the up and down arrow keys (703 and 707, respectively). In response to this user input, all of the character positions to the right of the active character position are completed with anticipated data. In this example, the city "Sacramento" 704 is selected as the anticipated data entry item.

In this example, "Sacramento" 704 is selected from the table 702, because it is the first entry found in the table 704 that conforms to the entered data at the time 712. That is, "Sacramento" is the first city in the table 702 that begins with the letter "S".

It is important to note that in other embodiments, different criteria can be used to select a particular item from the set of conforming data items. In this example, the set of conforming data items is all items in the table that begin with the letter "S". Further, in this example, the criterion used for selecting a particular conforming data item is that it appears first in the list, alphabetically.

In another embodiment, different criteria can be used, such as frequency of use and most recent use. For example in one embodiment, a frequency of use counter is maintained for each data item in the list 702. Accordingly, a data item having the highest frequency of use is selected from the set of conforming data items. In another embodiment, a date counter is maintained for each item in the list 702. In this example, the most recently used data item is selected from the set of conforming data items. Any method can be used to select the anticipated data item from the set of conforming data items at each point in time during the data entry process. Such methods would be apparent to persons skilled in the relevant art(s).

Next, as indicated by the time 714, the user selects the letter "A" in the second character position. At this point, the set of conforming data items is all items in the list 702 beginning with the letters "SA". This includes the data items

704-710. Using the alphabetical criterion as described above, the data item "Sacramento" is selected as the anticipated data entry.

Next, as indicated by the time 716, the user selects the letter "N" in the third character position. This letter can be quickly selected by the user because the scrollable character set at each position is limited in accordance with the allowable entry list 702. In this example, if the allowable data entry list 702 represents the entire list, then the allowable characters in the third character position is limited by to the letters "C" and "N".

When the "N" is selected, the set of conforming data items is all items in the list 702 beginning with the letters "SAN", namely 706-710. Again, using the alphabetical criterion as described above the data item "San Diego" is selected as the anticipated data entry.

Next, as indicated by the time 718, the user selects a space in the forth character position. At this point, the set of conforming data items remains the same. Therefore, the data item "San Diego" is selected as the anticipated data entry.

Next, as indicated by the time 720, the user selects the letter "F" in the fifth character position. At this point, the set of conforming data items is all items in the list 702 beginning with the letters "SAN F." The set of conforming data items that meets this criterion is "San Francisco" 78. Accordingly, "San Francisco" 708 is selected as the anticipated data entry.

As stated above, in one embodiment of the present invention, the precise location that is calculated by the GPS receiver 206 is used to determine the current time zone. This information can be used for example to set the clock 219 coupled to the navigation computer 204 to a highly accurate compensated local time, based on current position. This feature avoids the problem found in current systems where a local clock is not updated with a time zone is crossed.

Figure 8A:
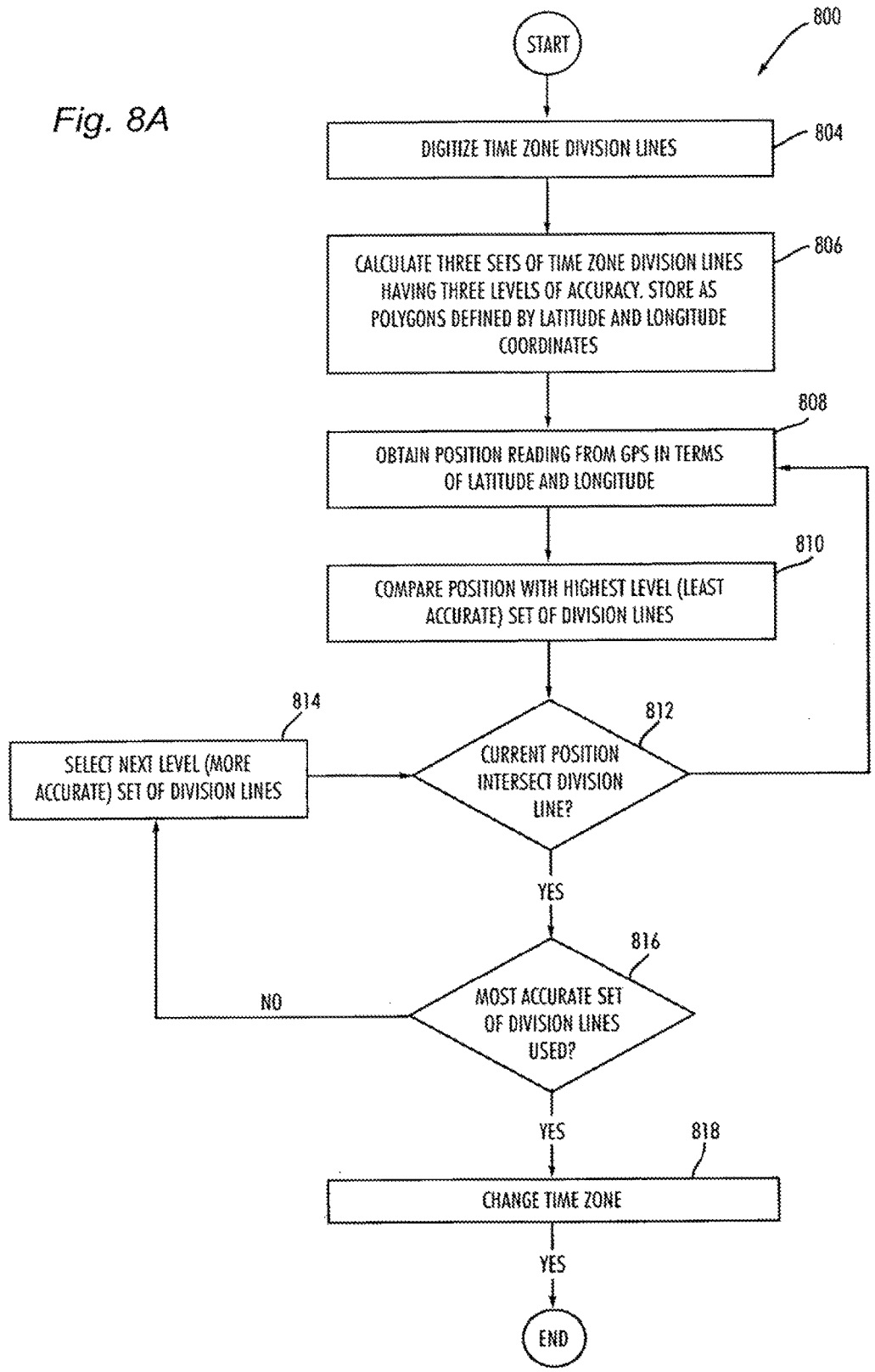
FIG. 8A is a flowchart depicting a process that can be used to implement an enhanced feature for determining current time zone information in accordance with an embodiment of the present invention.

FIG. 8A is a flowchart depicting a process that can be used to implement an enhanced feature for determining current time zone information in accordance with an embodiment of the present invention. In step 804 time zone division lines are input into the navigation computer system 204. One way to accomplish this is to digitize time zone division lines. In step 806 three sets of time zone division lines are stored in the computer system 204. Preferably, these lines are stored as three sets of polygons having an increasing level of accuracy, as indicated by step 806.

Accordingly, three sets of time zone division lines are stored, ranging in accuracy from course to medium to fine. The course time zone division lines are wider and not as accurate as the medium division lines, which in turn are wider and not as accurate as the fine division lines. As the level of accuracy increases, so does the number and complexity of the polygons that comprise the different sets of time zone lines. In other words, the course and medium time division lines are approximations that are used to quickly determine whether a current position is close to an actual time zone. If so, a more precise set of lines is used. The fine time zone division lines very accurately depict the shape and position of the actual time zone division lines. The fine set of lines is much more complex and requires more polygons than the less accurate course and medium sets of lines. This concept is illustrated in FIG. 8B.

Figure 8B:
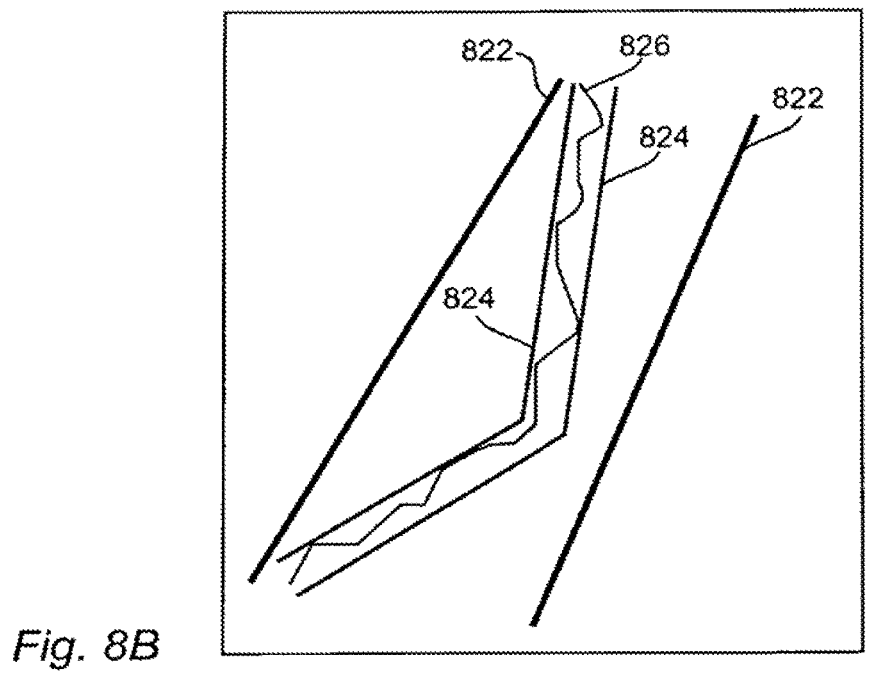
FIG. 8B is a depicts three sets of time zone division lines ranging in accuracy from course to medium to fine in accordance with an embodiment of the present invention.

In FIG. 8B, a portion of a course, medium and fine set of time zone lines are depicted. The actual time zone is coincident with the fine set of time zone lines that are represented by the line 826. In this example the fine set of division lines 826 exactly matches the width and shape of the actual time zone. The medium set of time zone division lines 824 represent a close approximation that encompasses the time zone line 826.

Note that the medium set of lines 824 can be represented with much fewer polygons than the fine set of lines 826. In this fashion, searches using the medium set of lines 824 for determining whether a current position is coincident with the time zone lines 824 can occur much faster than using the fine set of lines 826.

The course set of time zone division lines 822 represent a gross approximation of the time zone line 826. Note that the course set of lines 822 can be represented with fewer polygons than the medium set of lines 824. In this fashion, searches using the course set of lines 822 for determining whether a current position is coincident with the time zone lines 822 can occur much faster than using the medium set of lines 824. Accordingly, as shown below, searches are made first with the course set of lines 822, followed by the medium set of lines 824, followed by the fine set of lines 826.

Referring back now to FIG. 8A, in step 808, the process determines the current position from the GPS receiver 206 in terms of latitude and longitude. Next, in step 810, the process determines if the current position intersects with the course set of time division lines. It should be noted that comparing the position using the course set of time zone division lines is faster than using the medium set of time zone division lines. Similarly, the comparison using the medium set of time zone division lines is faster than using the fine set of time zone division lines. In this fashion, the medium and fine sets are used only when required (i.e. when the navigation system 102 gets closer to an actual time zone division line.)

When the navigation system 102 gets close to a time zone, the compare using the course approximation location information will indicate that an intersection between the current location and the course set of lines exist. This indicates that a higher resolution compare is required using a finer set of time zone division lines.

Accordingly, in step 810, a comparison is made between the current position and the course set of time zone division lines. In step 812, the process determines if the current position intersects with the time zone division lines in accordance with the comparison. If it does, the process determines if the most accurate set of division lines have been used in step 812. If so, control passes to step 818, where the new time zone is set. If not, the next finer set of division lines are used for another comparison, as indicated by steps 814 and 812.

If it is determined in step 812 that an intersection between the current position and the time zone lines do not exist, control passes back to step 808 and the process repeats. Note that an embodiment of the present invention may include a delay between steps 812 and 808. For example, it may be desirable to save CPU cycles by checking for a new time zone at specified intervals, rather than continuously.

Figure 9:
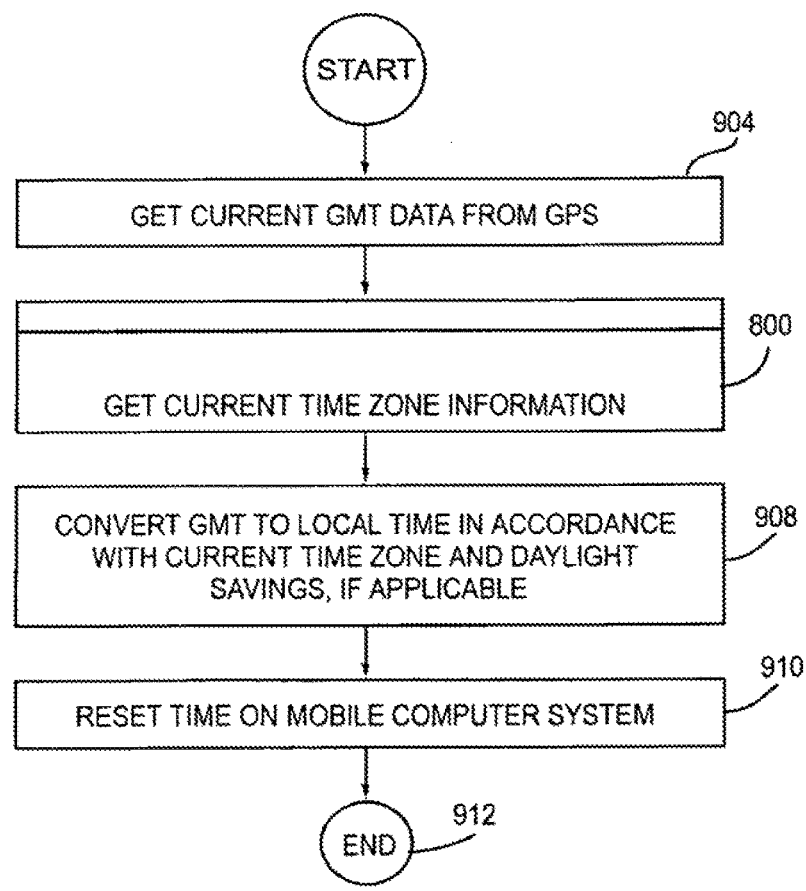
FIG. 9 is a flowchart depicting a process that can be used to calibrate a real-time clock in the navigation computer 204 in accordance with an embodiment of the present invention.

FIG. 9 is a flowchart depicting a process that can be used to calibrate a real-time clock in the navigation computer 204. The process begins with step 904. In step 904 the process determines the current time in Greenwich Mean Time (GMT) from the GPS receiver 206. Next, in step 906, the process determines the current time zone information. This can be accomplished using the process 800 as described above.

Next, in step 908, the process coverts the GMT to local time in accordance with the current time zone and daylight savings time and like. A database that is accessible to the navigation computer 204 is used for this purpose. In step 910 the process sets the local time of the navigation computer 204 in accordance with the time calculated in step 908. The process ends as indicated by step 912.

As stated above, the display screen 212 is used to display geographical maps from the mapping database 208. In addition, the current position of the automobile 102 is superimposed on the geographical map to indicate the current position and bearing. In this example, the display screen 212 is a liquid crystal display that conforms to the Auto PC platform specification maintained by Microsoft Corporation. In this example embodiment, the navigation system conforms to the Auto PC platform and thus 102 fits into a standard 1-DIN unit in the dash of the automobile 104. It is assumed that in accordance with this standard, the display screen 212 is on the order of 256 pixels wide by 64 pixels tall. An method for displaying a navigational mapping system on such a display will now be described with reference to FIG. 10.

Figure 10A:
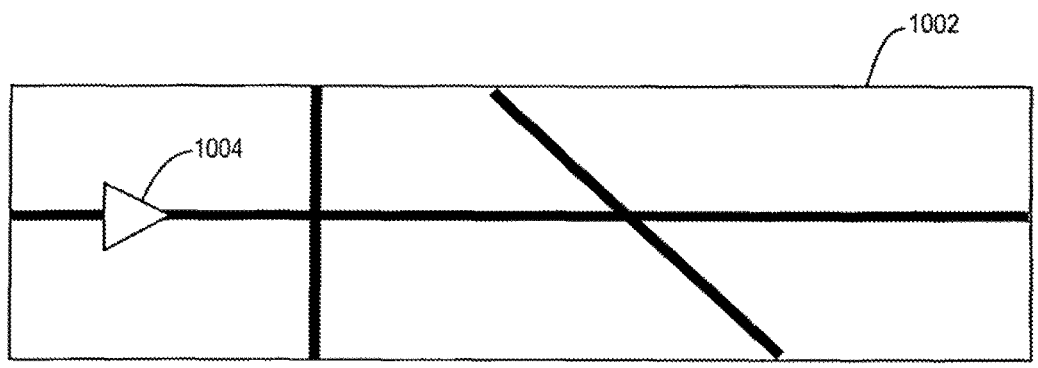
FIGS. 10A and 10B depict a navigational mapping system display in accordance with an embodiment of the present invention.

A "head-right" map display 1002 is shown in FIG. 10A. In this example, the automobile 104 is represented by the triangle 1004. In this example the automobile is heading from left to right. In the head-right display 1002, the map is continuously rotated such that the direction of the vehicle 1004 always points to the right. This method is much preferred over the current method of displaying maps such that the vehicle always points up. Using a head-right display is preferred due to the fact that the display screen 212 is significantly wider than it is tall. In this fashion, by using a head right display, more look-ahead space of the route is provided.

Figure 10B:
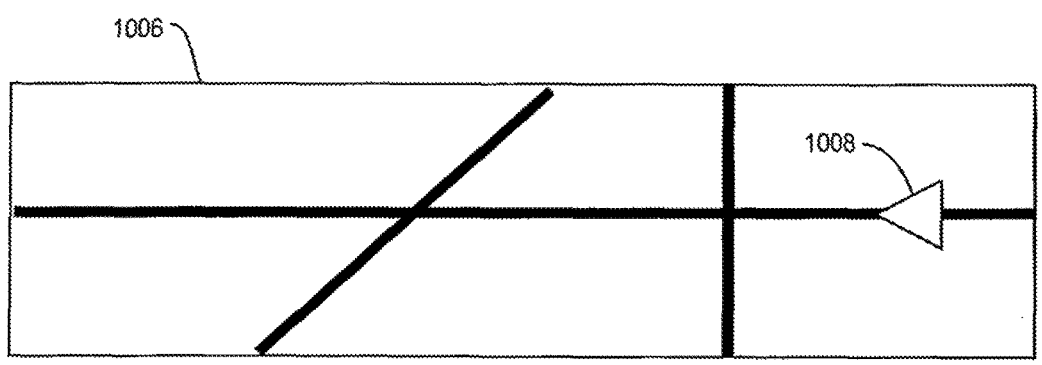

Alternatively, a "head-left" map display 1006 as shown in FIG. 10B can be used. This may be the preferred method for automobiles equipped with a steering wheel on the right side. In this example, the automobile 104 is represented by the triangle 1008 and is heading from right to left. In the head-left display 1006, the map is continuously rotated such that the direction of the vehicle 1004 always points to the left. This method is much preferred over the current method of displaying maps such that the vehicle always points up.

In one embodiment of the present invention, a database is maintained that maps time zone information to telephone numbers. This database is used to provide an enhanced user-interface feature of the present invention. In particular, the database is used to display the current local time of a called party, when dialing out on the telephonic device 210. The database used to implement this feature matches country codes, city codes, area codes, and local exchange information that comprise telephone numbers to time zone information.

Figure 11:
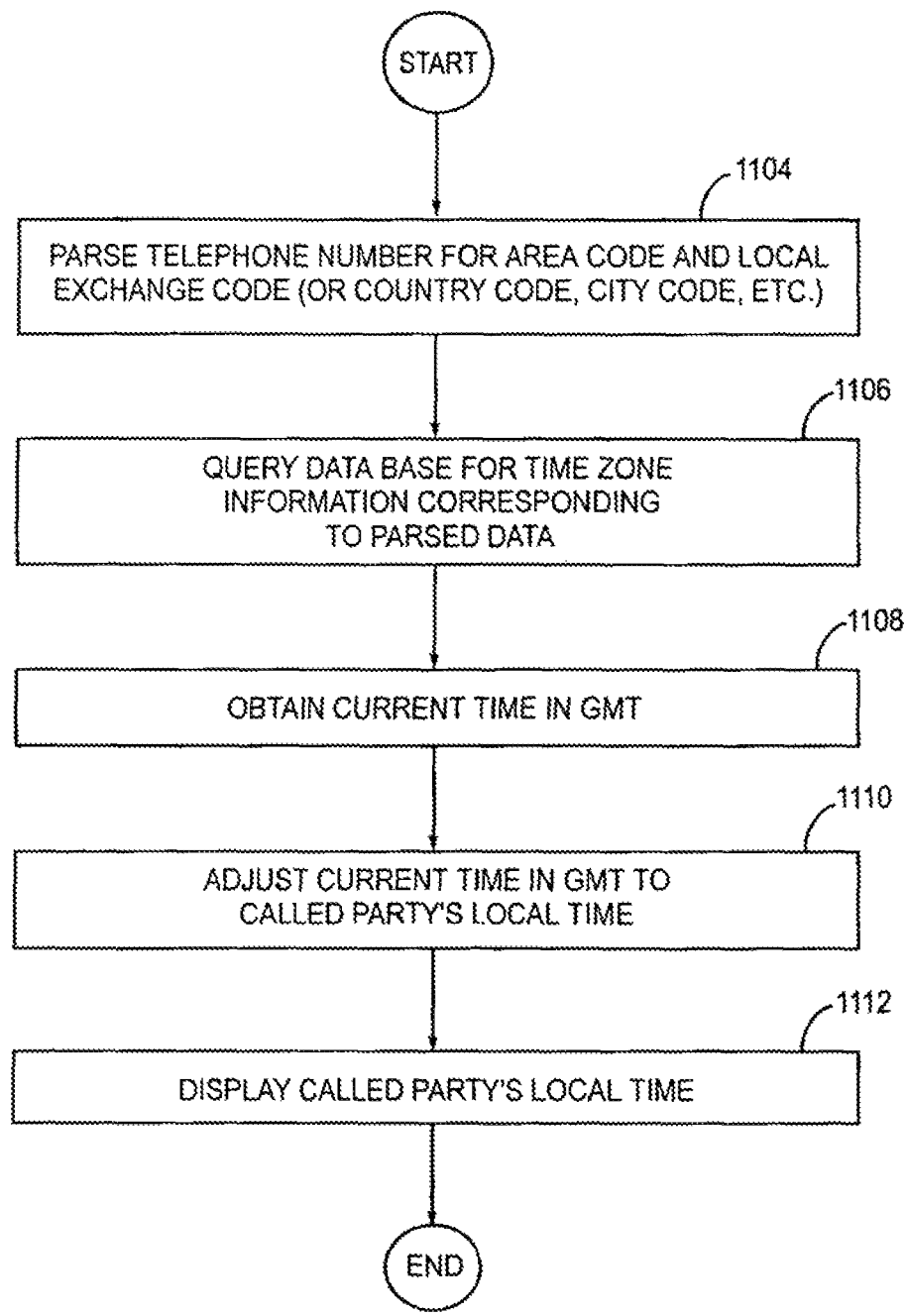
FIG. 11 is a flowchart depicting a process that can be used to implement the current time reporting feature of the present invention.

FIG. 11 is a flowchart depicting a process that can be used to implement this feature of the present invention. In step 1104, the telephone number input by the user is parsed to extract a country and city code, or an area code and three-digit exchange. Once this information is extracted, it is used in step 1106 to query a database that matches such information with time zone information. The time zone information is generally relative to universal time or GMT, and typically ranges from GMT −12 hours to GMT +12 hours. Once this information is retrieved from the database, the current time in GMT is obtained as indicated in step 1108.

After the current GMT is obtained, it is adjusted in accordance with the time zone information as indicated in step 1110. Finally, in step 1112, the adjusted time is displayed to the user.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method for navigation in a mobile device integrated with phone functions so that the mobile device makes or receives calls via a cellular telephonic network, the method comprising:
    displaying on an electronic map a current location of the mobile device determined from wireless signals, the electronic map being locally generated in the mobile device;
    accepting an inquiry from a user for a destination;
    communicating with a server over a wireless data network;
    sending the inquiry to the server, wherein the inquiry includes the current location and the destination, the server is configured to calculate a route from the current location to the destination using real time data to ensure that the route is optimum;
    receiving routing data from the server, wherein the routing data is a plain text description for each link in the route using pre-defined generic terms;
    reconstructing the route from the routing data by interfacing with local mapping data in a format required by the mobile device; and
    displaying on a display screen the route from the current location to the destination, wherein the route is highlighted on the electronic map, the electronic map is automatically updated to accommodate an indication that the mobile device has been travelling from the current location.

2. The method as recited in claim 1, wherein said reconstructing the route from the routing data is performed in the mobile device with respect to the local mapping data cached or preloaded therein.

3. The method as recited in claim 2, wherein the local mapping data is not updated when the routing data is detected supported by the local mapping data already in the mobile device.

4. The method as recited in claim 2, further comprising updating automatically the local mapping data when the routing data is detected unsupported by the local mapping data already in the mobile device before said reconstructing the route from the routing data is performed in the mobile device.

5. The method as recited in claim 2, wherein the routing data from the server is in a format acceptable to other navigation devices from different vendors each running local mapping database software.

6. The method as recited in claim 1, wherein the routing data from the server is compatible with a local map in the mobile device.

7. The method as recited in claim 1, wherein the inquiry further includes a preference defined by a user of the mobile device, and wherein the server is configured to calculate the route further in consideration of the preference.

8. The method as recited in claim 7, wherein the optimal route is calculated in consideration of the preference.

9. The method as recited in claim 1, wherein the server is configured to keep a profile of the user, and the optimal route is calculated in consideration of the profile.

10. The method as recited in claim 1, wherein said accepting an inquiry from a user for a destination comprises:
receiving an initial portion of the destination; and
completing the destination automatically without requiring the user to enter a remaining portion of the destination.

11. The method as recited in claim 10, wherein said reconstructing the route from the routing data comprises:
determining a starting point of the route in accordance with the current position;
reading the routing data; and
superimposing the route on the local map, wherein the route is highlighted.

12. A method for navigation in a mobile device integrated with phone functions so that the mobile device makes or receives calls via a cellular telephonic network, the method comprising:
receiving in a server an inquiry from the mobile device over a wireless data network, wherein the inquiry includes a current location and a destination, the current location is determined in the mobile device and the destination is entered by a user into the mobile device;
calculating in the server a route from the current location to the destination using real time data to ensure that the route is optimum;
downloading routing data from the server to the mobile device, wherein the routing data is a plain text description for each link in the route using pre-defined generic terms;
causing the mobile device to reconstruct the route from the routing data, wherein the mobile device is caused to display on a display screen thereof the route from the current location to the destination, the route is highlighted on the electronic map, the electronic map is automatically updated to accommodate an indication that the mobile device has been travelling from the current location.

13. The method as recited in claim 12, wherein the routing data is in a format such that the routing data is readable by a plurality of mobile devices from different vendors.

14. The method as recited in claim 12, wherein the route is reconstructed from the routing data in a format required by the mobile device by interfacing with local mapping data cached or preloaded therein.

15. The method as recited in claim 14, wherein the local mapping data is not updated when the routing data is detected supported by the local mapping data already in the mobile device.

16. The method as recited in claim 14, further comprising downloading automatically updated local mapping data to the mobile device when the routing data is detected unsupported by the local mapping data already in the mobile device before the route is reconstructed from the routing data in the mobile device.

17. The method as recited in claim 12, wherein the routing data from the server is acceptable to other navigation devices from different vendors each running local mapping database software.

18. The method as recited in claim 12, wherein the server is configured to keep a profile of the user, and the optimal route is calculated in consideration of the profile.

* * * * *

(12) INTER PARTES REVIEW CERTIFICATE (1309th)

United States Patent
Pu et al.

(10) Number: US 9,528,843 K1
(45) Certificate Issued: Jul. 29, 2019

(54) MOBILE NAVIGATION SYSTEM OPERATING WITH A REMOTE SERVER

(71) Applicant: InfoGation Corporation

(72) Inventors: Kent Qing Pu; Hui Henry Li

(73) Assignee: Infogation Corporation

Trial Numbers:

IPR2017-01656 filed Jun. 28, 2017
IPR2017-01677 filed Jun. 28, 2017

Inter Partes Review Certificate for:

Patent No.: 9,528,843
Issued: Dec. 27, 2016
Appl. No.: 14/826,880
Filed: Aug. 14, 2015

The results of IPR2017-01656 and IPR2017-01677 are reflected in this inter partes review certificate under 35 U.S.C. 318(b).

INTER PARTES REVIEW CERTIFICATE
U.S. Patent 9,528,843 K1
Trial No. IPR2017-01656
Certificate Issued Jul. 29, 2019

AS A RESULT OF THE INTER PARTES REVIEW PROCEEDING, IT HAS BEEN DETERMINED THAT:

Claims 1, 2, 5, 7, 10 and 11 are cancelled.

\* \* \* \* \*